United States Patent [19]

Organek et al.

[11] Patent Number: 5,651,437
[45] Date of Patent: Jul. 29, 1997

[54] CLUTCH BALL RAMP ACTUATOR TO MAINTAIN STATE UPON LOSS OF POWER

[75] Inventors: Gregory J. Organek, Detroit; Jon A. Steeby, Schoolcraft; David M. Preston, Clarkston, all of Mich.

[73] Assignee: Eaton Corporation, Cleveland, Ohio

[21] Appl. No.: 633,639

[22] Filed: Apr. 17, 1996

[51] Int. Cl.$^6$ .................. F16D 13/04; F16D 43/20
[52] U.S. Cl. .................. 192/35; 192/40; 192/54.52; 192/84.7; 192/93 A
[58] Field of Search .................. 192/35, 40, 48.2, 192/48.92, 84.2, 84.7, 93 A, 54.52

[56] References Cited

U.S. PATENT DOCUMENTS

| | | | |
|---|---|---|---|
| 2,937,729 | 5/1960 | Sperr et al. | 192/84.7 |
| 4,805,486 | 2/1989 | Hagiwara et al. | 192/85 C X |
| 5,078,249 | 1/1992 | Botterill | 192/93 A |
| 5,092,825 | 3/1992 | Goscenski, Jr. et al. | 475/150 |
| 5,469,948 | 11/1995 | Organek et al. | 192/35 |
| 5,485,904 | 1/1996 | Organek et al. | 192/35 |
| 5,505,285 | 4/1996 | Organek | 192/35 |

*Primary Examiner*—Andrea L. Pitts
*Attorney, Agent, or Firm*—Loren H. Uthoff, Jr.; Howard D. Dordon

[57] ABSTRACT

A ball ramp actuator having a control ring axially separated from a pressure plate by rolling members engaging matching opposed grooves having a variable depth acting to supply an axial clamping force against a clutch disc in a clutch assembly and a releasable one-way clutch having a first race attached to the control ring and a second race attached to the pressure plate acting to only allow relative rotation between the control ring and the pressure plate in a direction to increase the clamping force on the clutch disc until a release coil is energized to release the one-way clutch thereby allowing the control ring to rotate relative to the pressure plate in a direction to decrease the clamping force on the clutch disc. A control coil is used to apply an electromagnetic force on the control ring to activate the ball ramp actuator.

14 Claims, 3 Drawing Sheets

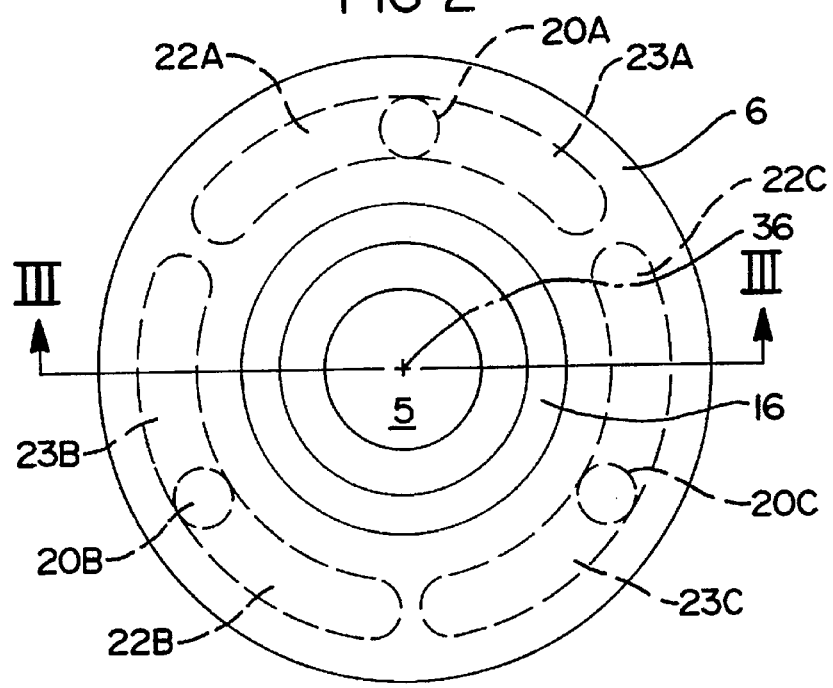
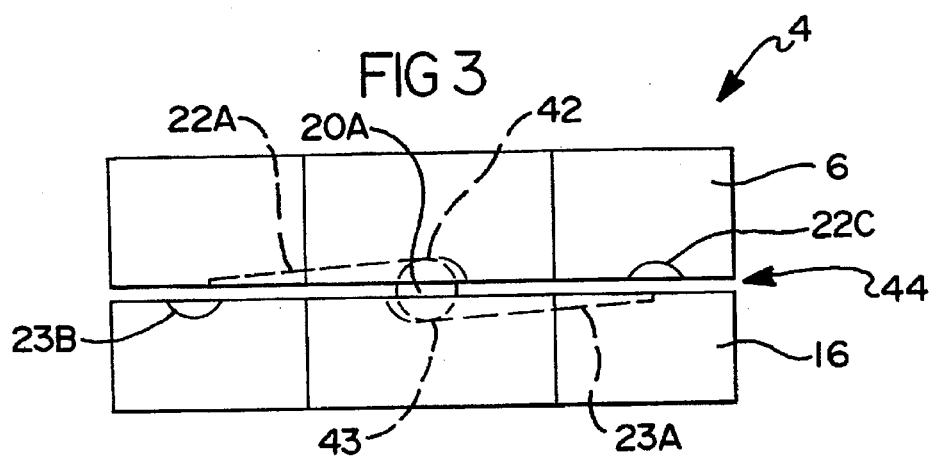
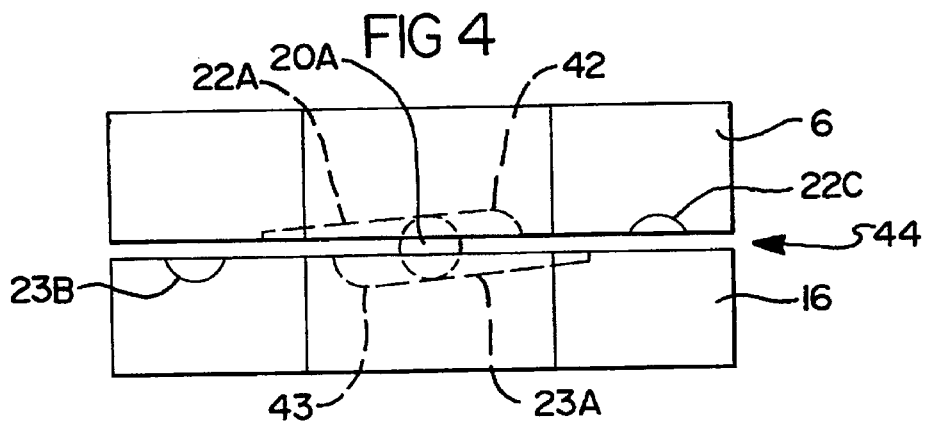

CLUTCH BALL RAMP ACTUATOR TO MAINTAIN STATE UPON LOSS OF POWER

RELATED APPLICATIONS

This application is related to U.S. Pat. No. 5,469,948 entitled "Clutch Ball Ramp Actuator With Coast Lock" and U.S. Pat. No. 5,485,904 entitled "Clutch Ball Ramp Actuator With Drive and Coast Apply", both of which are assigned to the same assignee, Eaton Corporation, as this application.

BACKGROUND OF THE INVENTION

The present invention relates to a vehicle driveline clutch and, more particularly, to a vehicle driveline clutch where a friction disc is clamped to an engine flywheel using an electronically controlled one-way clutch and used to provide a drive and coast driveline clutch lock-up and release.

Driveline clutches commonly use a plurality of high rate coil springs to clamp a pressure plate against a friction disc to an engine flywheel. The springs are disposed within a pressure plate assembly which is bolted to the engine flywheel. A mechanical linkage controls the pressure plates spring mechanism is displaced through action of the operator to control the lock-up and release of the driveline clutch.

There have been extensive efforts to automate the operation of the driveline clutch using electronics to allow for its operation independent of actions of the operator. It is known to use an electro-mechanical or hydraulic powered actuator connected to a mechanical linkage to, in essence, replace the operator for more accurate clutch operation during transmission shift events. Using such an actuator, the mechanical linkage is moved in response to an electrical control signal generated by a microprocessor-based control unit which is used to process a variety of vehicle sensor inputs and other operating conditions to determine when and in what manner the driveline clutch should be activated or deactivated.

The use of a ball ramp actuator to load a clutch pack in a vehicle driveline is known. U.S. Pat. No. 4,805,486 discloses a limited slip differential where a clutch pack is loaded in response to the activation of a ball ramp actuator initiated by rotation of a servo motor or a solenoid driven brake shoe acting on an activating ring. A ball ramp actuator has also been utilized in a vehicle transmission to engage and disengage gearsets by loading a gear clutch pack in response to a signal as disclosed in U.S. Pat. No. 5,078,249, the disclosure of which is hereby incorporated by reference.

U.S. Pat. No. 5,469,948 and U.S. Pat. No. 5,485,904, the disclosures of which are hereby incorporated by reference, disclose clutch ball ramp actuators which utilize a coil to energize and provide a breaking force to a control ring thereby activating a ball ramp actuator to supply a clamping load on a friction disc. Both of these patents also disclose the use of a one-way clutch to prevent rotation of the control ring in a direction releasing the driveline clutch where one side of the one-way clutch is connected to the output shaft (transmission input shaft) using the control coil such that the one-way clutch is only active when the control coil is energized.

The advantage of the ball ramp mechanism as compared to other actuators is that it converts rotary motion into axial motion with a very high force amplification, often 100:1 or greater. In most of these applications, one side of the ball ramp actuator, commonly called a control ring or plate, reacts against case ground through the force induced by an electromagnetic field generated by an electrical current in a coil or, in the alternating, the control ring is rotated by an electric motor relative to case ground. To generate greater clamping forces, electrical current supplied to the coil motor is increased thereby increasing the reaction of the control ring case ground which rotates the control ring relative to an activation ring thereby causing rolling elements within the ball ramp mechanism to engage corresponding ramps in the control and activation rings which increase the axial movement and clamping force on the clutch disc. One problem with the use of the ball ramp actuator to supply the clutch clamping force is that the mechanics of a single ramp ball ramp mechanism results in a loss of clamping force when the energizing current is removed.

In otherwords, this type of a prior art ball ramp actuated clutch will cause the driveline clutch to disengage when the clutch control unit fails to supply electrical energy into the coil. The ball ramp actuator is then free to move in a direction that results in deactivation of the driveline clutch. In this circumstance, the relative rotation of the activation ring and control ring has been reversed such that the ball ramp axial displacement is collapsed thereby allowing the pressure plate to pull away from the clutch disc. The result is that the engine is disengaged from the transmission and any engine drive or braking effect is eliminated. It would be desirable for the ball ramp actuator to maintain its state (position) upon the loss of power from the clutch control unit.

The ball ramp actuator comprises a plurality of rolling elements, control ring and an opposed activation ring where the activation ring and the control ring define at least three opposed single ramp surfaces formed as a circumferential semi-circular grooves, each pair of opposed grooves containing one roller element. A thrust bearing is interposed between the control ring and a housing member, rotating with and connected to the input member such as a flywheel. An electromagnetic coil is disposed adjacent to one element of the control ring so as to induce a magnetic field that loads the control ring which in turn causes relative rotation between the control and activation rings of the ball ramp actuator.

SUMMARY OF THE INVENTION

The present invention is characterized by a rotational input member such as an engine flywheel and a rotational output member such as a transmission input shaft which are rotationally coupled through a clutch disc which is clamped between the flywheel and an activation ring through the axial expansion of a ball ramp actuator. The ball ramp actuator includes a control ring having single direction variable depth grooves (ramps) and an activation ring (pressure plate) having single direction variable depth grooves at least partially opposed to those of the control ring where the activation ring is selectively prevented from rotating in a direction to release the driveline clutch by action of an electronically controlled one-way clutch. An electromagnetic coil is used to electromagnetically couple the control ring to a case ground such as the transmission case. The ball ramp actuator provides a clamping force on the clutch friction disc where the clamping force can only be increased by electronic energization with the coil. A one-way clutch attached to the pressure plate and the control ring prevents relative rotation of these elements thereby preventing release of the ball ramp actuator. Upon lock-up between the flywheel and the transmission input shaft, the parasitic energy loss can be minimized since there is no need to continue to supply electrical current to the control coil to maintain the energized state of the ball ramp actuator. The one-way clutch is electronically controlled by way of a release coil which, when energized, allows the control plate to rotate in a deactivating direction thereby releasing the clutch plate. When the release coil is not energized, the one-way clutch is activated and will only allow the control ring to rotate in a direction relative to the pressure plate so as to further energize the ball ramp actuator thereby maintaining engagement of the driveline clutch.

One provision of the present invention is to prevent a ball ramp actuated clutch from disengaging when electrical power is lost.

Another provision of the present invention is to prevent a ball ramp actuated clutch from disengaging using a one-way clutch controlled by a release coil.

Another provision of the present invention is to prevent a ball ramp actuated clutch from disengaging upon the loss of electrical power by locking the rotational orientation between a control ring and an activation ring using a one-way clutch.

Another provision of the present invention is to prevent a ball ramp mechanism from disengaging when the driveline torque is reversed by locking the rotational orientation between a control ring and an activation ring using a one-way clutch having a first race connected to an activation ring and a second race connected to the control ring.

Another provision of the present invention is to prevent a ball ramp mechanism from disengaging by locking the rotational orientation between a control ring and an activation ring using a one-way clutch having a first race connected to the activation ring and a second race connected to the control ring where the one-way clutch is normally engaged and electronically disengaged using a release coil.

Still another provision of the present invention is to prevent a ball ramp mechanism from disengaging by locking the rotational orientation between a control ring and an activation ring using a one-way clutch having an outer race connected to the activation ring and an inner race connected to the control ring where the one-way clutch is normally engaged and electronically disengaged using a release coil mounted to ground.

The present invention makes use of a one-way clutch defined for purposes of this application as any mechanism which permits rotation of an element in one direction and prevents substantial rotation in the opposite direction. The purpose of the one-way clutch as used in the ball ramp actuator of the present invention is to hold the control ring in a fixed position relative to the activation ring so as to maintain the axial separation in the ball ramp actuator and the existing clamping force on the clutch plate even when electrical power is lost. Using a one-way clutch allows a clutch having a unidirectional ball ramp actuator with single angle ramps (grooves which only apply a clamping load when the control ring is rotated in one direction relative to the activation ring) to maintain a clutch clamping force when the engine is driving or being driven without further input from the clutch control unit. The present invention provides for electronic control of the disengagement of the one-way clutch such that the clamping force can be released at any time. The clutch can be released by energizing a release coil which disengages the one-way clutch which allows the ball ramp actuator to collapse.

Thus, with the use of a one-way clutch acting essentially between a transmission input shaft and the control ring of a ball ramp actuator having single angle grooves, the clamping force of a clutch disc can be selectively maintained as the input torque to the driveline clutch is reversed or when electrical power is lost to the control coil.

BRIEF DESCRIPTION OF THE DRAWINGS

FIG. 2 is a front sectional view taken along line II—II of FIG. 1 of the activation ring, control ring and pressure plate of the ball ramp actuator of the present invention;

FIG. 3 is a sectional view of the ball ramp actuator of the present invention taken along line III—III of FIG. 2 with the actuator in a nonenergized state;

FIG. 4 is a sectional view of the ball ramp actuator of the present invention taken along line III—III of FIG. 3 with the first ball ramp actuator in an energized state;

DETAILED DESCRIPTION OF THE PREFERRED EMBODIMENT

Figure 1:
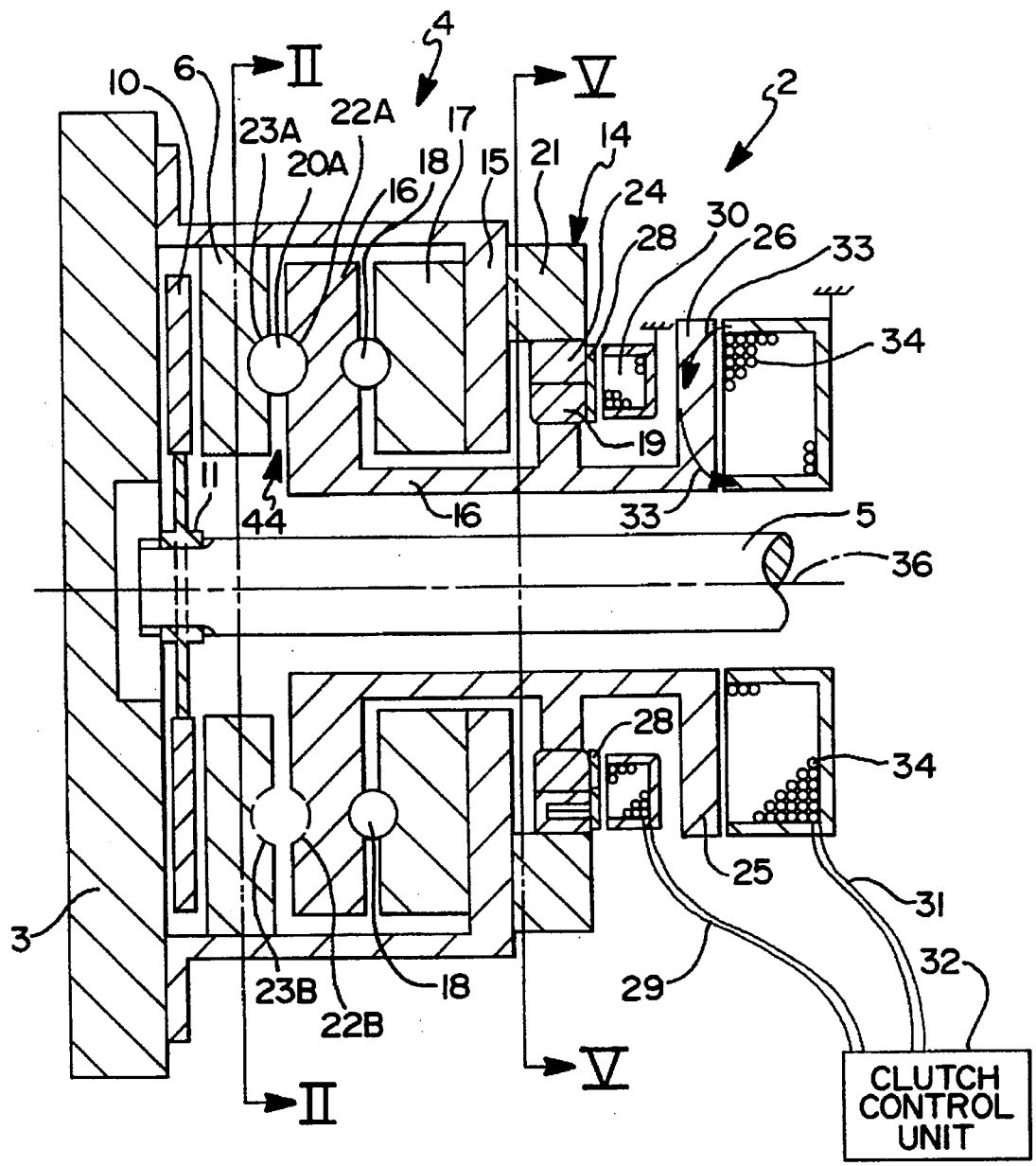
FIG. 1 is a partial cross-sectional view of the ball ramp actuator of the present invention mounted to input and output members.

For purposes of promoting the understanding of the principles of the invention, reference will now be made to the embodiment illustrated in the drawings and specific language will be used to describe the same. It will nevertheless be understood that no limitation on the scope of the invention is thereby intended, such alterations and further modifications in the illustrated device, and such further applications of the principles of the invention as illustrated therein being contemplated as would normally occur to one skilled in the art to which the invention relates.

In this disclosure, certain terminology will be used in the following description for convenience in reference only and will not be limiting. The terms "rightward" and "leftward" will refer to directions in the drawings in connection with which the terminology is used. The terms "inwardly" and "outwardly" will refer to directions toward and away from, respectively, the geometric center of the apparatus of the present invention. The terms "upward" and "downward" will refer to directions as taken in the drawings in connection with which the terminology is used. All foregoing terms mentioned above include the normal derivatives and equivalents thereof.

Now referring to FIG. 1 of the drawings, a cross-sectional view of the ball ramp actuator 4 of the present invention mounted to input and output members is shown. The clutch assembly 2 of the type in which the present invention is utilized employs a ball ramp actuator 4 of which a pressure plate 6 (also known as an activation ring) is used to supply axial force to clamp a clutch disc 10 which is nonrotatably attached to an output member 5 which can be a transmission input shaft between the pressure plate 6 and an input member 3 which can be an engine flywheel. The clutch assembly 2 could be utilized as a driveline clutch in a vehicle to frictionally couple a flywheel to a transmission input shaft (output member 5). The input member 3 is rotatably driven by a prime mover (not shown) such as an internal combustion engine through a crankshaft. The crankshaft rotates the input member 3 which is coupled to the output member 5 through the clutch assembly 2 of the present invention by the clamping action of the pressure plate 6 to the clutch disc 10 which rotatably drives the output member 5. The pressure plate 6 is used to clamp the clutch disc 10 which is nonrotatably attached to the output member 5 through engagement of a plurality of shaft splines 11 to the input member 3 thereby transferring the rotational power from the prime mover to the output member 5 and subsequently to a device that requires rotational energy such as a vehicle driveline.

For purposes of this disclosure, the input member 3 can be attached to any type of rotational prime mover such as an electric motor and the output member 5 can be any type of rotational shaft connected to a motion transferring device. Thus, the rotational input member 3 would be the engine flywheel and the rotational output member 5 would be the transmission input shaft of a gearchange transmission as used in a vehicle driveline.

The pressure plate 6 is typically forced toward the input member 3 such as a flywheel using the reaction of a plurality of high rate clutch springs. However, the present invention uses the axial force generated by the ball ramp actuator 4 to generate a force directly to the pressure plate 6 thereby clamping the clutch disc 10 to the input member 3.

Ball ramp mechanisms are well known in the art and have been used to load transmission and gear clutches as disclosed in U.S. Pat. No. 5,078,249, the disclosure of which is hereby incorporated by reference, and differential clutch packs as disclosed in U.S. Pat. No. 5,092,825, the disclosure of which is hereby incorporated by reference. In the prior art, the ball ramp control mechanism is energized through the reaction of a control ring against case ground or electromagnetic coupling to the output shaft by an electrical coil or motor. The detailed operation of the ball ramp actuator 4 is disclosed in U.S. Pat. No. 5,078,249 and U.S. Pat. No. 5,092,825.

The relative rotational motion between a control ring 16 and the pressure plate 6 causes a plurality of rolling elements 20A, 20B and 20C (see FIG. 2) to move along grooves 22A, 22B, 22C, 23A, 23B and 23C which are variable in depth along their length. The ring grooves 22A, 22B and 22C formed in a first face of a control ring 16 oppose corresponding plate grooves 23A, 23B and 23C formed in first side of the pressure plate 6. Thus, relative rotation of the control ring 16 and the pressure plate 6 cause the rolling members 20A, 20B and 20C to traverse their respective ring grooves 22A, 22B and 22C and simultaneously plate grooves 23A, 23B and 23C thereby causing the control ring 16 to axially move relative to the pressure plate 6. The pressure plate 6 is axially movable but nonrotationally coupled with reference to the input member 3 and the housing 15 to contact and frictionally engage the clutch disc 10 at a second side of the pressure plate 6. A thrust bearing 18 is used to transfer the axial force generated by the control ring 16 and the pressure plate 6 where a second face of the control ring 16 contacts the thrust bearing 18. The thrust bearing 18 can be of a type using spherical rolling elements or of a design using any type of suitable materials or elements to transfer the axial load such as a needle bearing. Thus, as the ball ramp actuator 4 expands to axially displace the pressure plate 6, the force reacts through the thrust bearing 18 to the base ring 17 into the housing 15 to the input member 3. An outer race 21 of the one-way clutch 14 is supported by the housing 15 and thus, is nonrotatably connected to the input member 3 and the pressure plate 6. The control extension 26 is formed as part of the control ring 16 so as to magnetically interact with a control coil 34 mounted to case ground such that when electrical current is supplied to the control coil 34 by the control unit 32, the control extension 26 is magnetically attracted (and can be frictionally connected) to the control coil 34 and case ground similar to the method used in an automotive air conditioning compressor.

The one-way clutch 14 is normally engaged thereby transferring rotational energy from the inner race 19 to the outer race 21 in a normal condition. A release coil 30 is positioned adjacent to the one-way clutch 14 which, when electrically energized by the control unit 32, magnetically attracts a release plate 28 which in turn releases the one-way clutch 14 so that the inner race 19 can rotate in either direction relative to the outer race 21. The release coil 30 is shown symbolically as mounted to a ground member such as a transmission housing (not shown). This allows the control ring 16 to rotate relative to the pressure plate 6 only controlled by the control coil 34 acting on the control extension 26. The inner race 19 is nonrotatably connected to the control ring 16 and the outer race 21 is nonrotatably coupled to the housing 15 and the pressure plate 6. Thus, when the one-way clutch is engaged (the release coil is not energized), the control ring 16 can only rotate relative to the pressure plate 6 in a direction to further separate the ball ramp actuator 4 thereby preventing release of the clutch assembly 2.

The control ring 16 extends rightwardly to provide support for the inner race 19 of a one-way clutch 14 and forms a control extension 26 for magnetic interaction with control coil 34. Control coil 34 is mounted to ground such as the case of a transmission and is electrically energized by the clutch control unit 32. The control coil 34 produces an electromagnetic field 33 which introduces a braking force in the control extension 26 which is transferred to the control ring 16. The control coil 34 is mounted to a ground member (not shown) such as a transmission housing. A friction surface can be formed on the control extension 26 which causes the control ring 16 to be frictionally rotatably connected to case ground when the control coil 34 is electrically energized by the clutch control unit 32. In either case, the electromagnetic field 33 generated by the control coil 34 links the control extension 26 to the control coil 34 and case ground as illustrated in FIG. 1. In a similar manner, the release coil 30 which is also mounted to a case ground such as the transmission case, frictionally connects the release plate 28 to a ground member symbolically shown in FIG. 1 when the release coil 30 is electrically energized by the clutch control unit 32 thereby applying an electromagnetic braking force on the release plate 28. This braking force causes the control ring 16 to rotate relative to the pressure plate 6 thereby causing separation of the control ring 16 and the pressure plate 6.

Now referring to FIG. 2, the control ring 16 is shaped in a disc configuration surrounding the output member 5 and both rotating about a common axis of rotation 36. The control ring 16 has a plurality of radial ring grooves 22A, 22B and 22C formed therein which vary in axial depth along their length (see FIGS. 3 and 4). Ring grooves 22A, 22B and 22C constrain respective rolling elements 20A, 20B and 20C. In a similar manner, the pressure plate 6 contains a like number and orientation of circumferentially extending plate grooves 23A, 23B and 23C opposing the ring grooves 22A, 22B and 22C formed in the control ring 16. Specifically, control ring groove 22A is partially opposed to pressure plate groove 23A when the ball ramp mechanism 4 is in a nonenergized state as shown in FIG. 3 and more directly opposes the pressure plate groove 23A when in a partially energized state as shown in FIG. 4.

Upon relative rotational motion between the control ring 16 and the pressure plate 6, the spherical element 20A rolls in the control ring groove 22A and pressure plate groove 23A where the variable depth of the grooves 22A and 23A provide for an axial motion that tends to separate the control ring 16 from the pressure plate 6. This motion is more clearly exemplified in FIGS. 3 and 4 and reference thereto will now be made. FIGS. 3 and 4 are sectional views of FIG. 2 taken along line III—III of the control ring 16 and the pressure plate 6 of the present invention. FIG. 3 shows the ball ramp mechanism 4 in a nonenergized state where the spherical element 20A is located at the deepest portion of control ring groove 22A and the deepest portion of the pressure plate groove 23A thereby establishing a relatively narrow separation gap 44 between the control ring 16 and the pressure plate 6. In a nonenergized state as shown in FIG. 3, separation gap 44 is relatively narrow and after relative rotation of the control ring 16 relative to the pressure plate 6 to the energized state shown in FIG. 4, the separation gap 44 is significantly wider. This axial motion is used to axially move the pressure plate 6 toward the input member 3 thereby supplying a clamping force on the clutch disc 10.

FIG. 4 illustrates a relationship between the control ring 16 and the pressure plate 6 when the ball ramp mechanism 4 is energized by supplying electrical current to control coil 34 from the clutch control unit 32. The magnetic interaction between control coil 34 (which is attached to ground) and the control extension 26 causes a braking effect on the control ring 16 so as to electromagnetically connect the control ring 16 to case ground. Thus, since the pressure plate 6 is rotating with the input member 3, the relative rotational speed difference between the input member 3 and case ground causes a relative rotational motion to be induced between the pressure plate 6 and the control ring 16. This relative rotational motion causes control ring 16 to rotate relative to the pressure plate 6 to establish a geometrical relationship similar to that shown in FIG. 4. Separation gap 44 has significantly increased compared to the nonenergized state of FIG. 3. The spherical element 20A has rolled along both the control ring groove 22A and the pressure plate groove 23A to an intermediate depth of the grooves 22A and 23A thereby separating the control ring 16 from the pressure plate 6 and providing axial movement of the pressure plate 6 (which rotates with the support housing 22) as shown by the increase in the separation gap 44 which is transferred for clamping of the clutch disc 10 to the input member 3. Referring to both FIG. 3 and FIG. 4, the relative rotational movement of the control rim 16 relative to the pressure plate 6 is further illustrated by reference to points 42 and 43 on the ring groove 22A and the plate groove 23A respectively.

Figure 5:
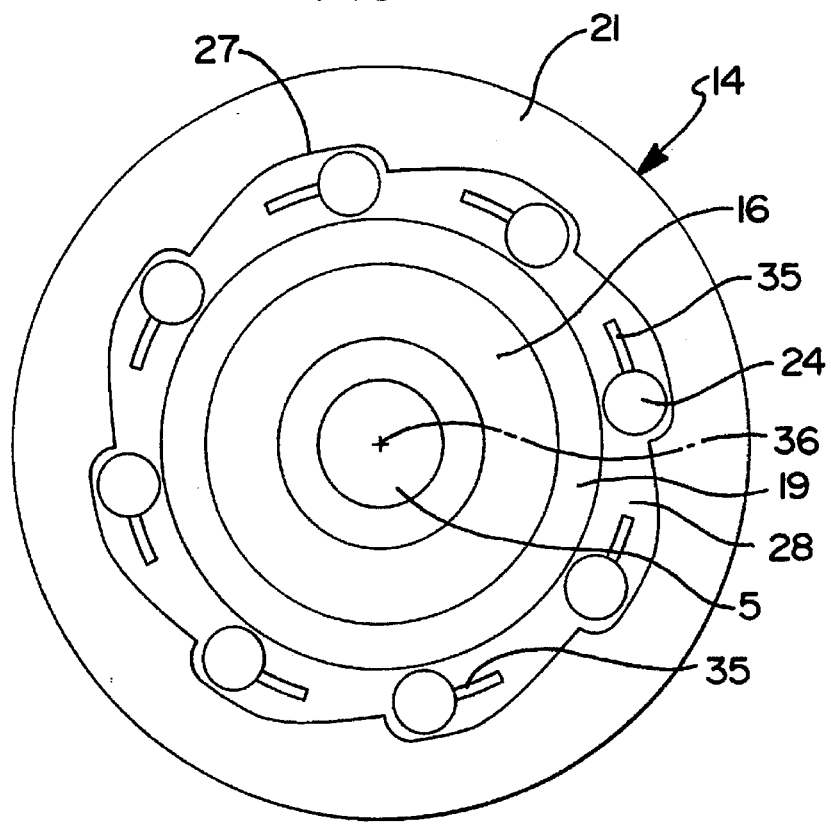
FIG. 5 is a sectional view of the ball ramp actuator of the present invention taken along line V—V of FIG. 1.

FIG. 5 is a sectional view of the ball ramp actuator of the present invention taken along line V—V of FIG. 1 more clearly illustrating the structure of the one-way clutch 14. The outer race 21 has a plurality of wedge shapes 27 formed on its inner periphery to receive a like number of rolling members 24 shown as cylindrical rollers. Formed on the release plate 28 are tabs 35 each of which axially extend from the release plate 28 to contact a rolling element 24. The release plate 28 has an axis of rotation coinciding with axis of rotation 36 of the output member 5. The tabs 35 force the rolling members into the position shown in FIG. 5 which is a position in which the one-way clutch 14 is released so as to allow the control ring 16 to rotate relative to the pressure plate 6 to contact the ball ramp actuator 4 to release the driveline clutch 2 when the release coil 30 is energized by the clutch control unit 32. If the release coil 30 is not energized, the control ring 16 can only rotate relative to the pressure plate 6 in a direction to further separate the control ring 16 from the pressure plate 6 to increase the clamping load on the clutch disc 10 since the rolling members 24 become wedged between the inner and outer races 19, 21 due to the wedge shapes 27. Thus, the one-way clutch 14 locks the ball ramp actuator 4 in a given state of activation and the electrical power can be removed without affecting the degree of engagement of the driveline clutch assembly 2.

Figure 6:
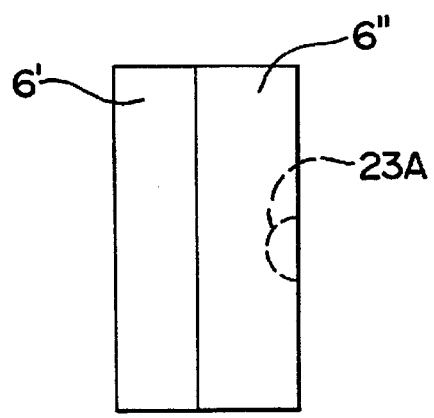
FIG. 6 is a front elevational view of an alternate embodiment of the pressure plate of the present invention.

Now referring to FIG. 6, an alternate embodiment of the pressure plate 6 is shown. The pressure plate 6 has been divided into two parts, a pressure plate 6' and an activation plate 6" where the plate grooves 23A, 23B and 23C that hold the rolling members 20A, 20B and 20C respectively, are formed in the activation plate 6" which contacts and pushes against the pressure plate 6'. The pressure plate 6' then contacts and frictionally engages the clutch disc 10.

To provide for continued engagement of the driveline clutch assembly 2 which would normally cause the ball ramp mechanism 4 to constrict and thereby release the clutch assembly 2, the release coil 30 remains nonenergized and the one-way clutch 24 prevents the control ring 16 from rotating relative to the pressure plate 6 except in a direction further energizing the clutch assembly 2. To release the clutch assembly 2, the release coil 30 is energized by the clutch control unit 32 which electromagnetically connects the release plate 28 to case ground which causes the tabs 35 to force the rolling members 24 into a position on the wedge shapes 27 allowing free rotation of the one-way clutch 14 in either direction.

Assuming the present invention is applied to a vehicle driveline, once the clutch assembly 2 is engaged by action of the ball ramp mechanism 4, and the one-way clutch 14 engages and the engine can supply power to the vehicle driveline thereby propelling the vehicle, or when it is no longer desirable to increase the speed of the vehicle by supplying power from the engine to the driveline, the engine power is decreased and the engine can brake the vehicle by reversing the flow of rotational power from the engine to the driveline to one flowing from the driveline to the engine. Unless the release coil 30 is energized, the one-way clutch 14 serves to maintain the relative rotational position of the pressure plate 6 relative to the control ring 16 thereby maintaining the clamping force between the pressure plate 6 and the input member 3 (flywheel) so as to maintain a frictional rotational coupling between the output member 5 (transmission input shaft) and the input member 3 (flywheel) so that the driveline can supply rotational power to the engine which, if the engine throttle is closed, will tend to brake the vehicle. Thus, according to the present invention, the state of the driveline clutch assembly 2 and the ball ramp actuator 4 is maintained in spite of an electrical power loss to the control coil 34. An engaged clutch assembly 2 remains engaged until the release coil 30 is energized.

This invention has been described in great detail, sufficient to one skilled in the art, to make and use the same. Various alterations and modifications of the invention will occur to those skilled in the art upon the reading and understanding of the foregoing specification, and it is intended to include all such alterations and modifications as part of the invention, insofar as they fall within the scope of the intended claims.

We claim:

1. A ball ramp actuator for coupling rotating input member to an output member comprising:

an input member driven by a prime mover and rotating about an axis of rotation;

an output member having an axis of rotation coaxial with said axis of rotation of said input element for rotating an output device;

a ball ramp actuator for generating an axial displacement comprising: an annular control ring selectively magnetically coupled to said output member to rotate therewith; said control ring having at least two circumferential grooves formed in a first face of said control ring, said grooves increasing in axial depth along their length; an equivalent number of rolling elements one occupying each of said grooves; a pressure plate having an axis of rotation along said axis of rotation of said control ring and rotatably coupled to said input member, said pressure plate having at least two grooves substantially identical in number, shape and radial position to said grooves formed in said control ring where said grooves formed in said pressure plate at least partially oppose said grooves formed in said control ring and where each of said rolling elements is trapped between one of said grooves formed in said pressure plate and one of said grooves formed in said control ring where said control ring is axially and rotationally movably disposed relative to said pressure plate;

a clutch disc disposed between said input member and said pressure plate and nonrotatably connected to said output member, said clutch disc being clamped between said input member and said pressure plate when said ball ramp actuator is energized thereby frictionally coupling said input member to said output member;

a one-way clutch having an inner race connected to said control ring and an outer race rotating with said pressure plate, said one-way clutch disposed to prevent relative rotation between said control ring and said pressure plate in a direction resulting in a reduction in an axial separation of said control ring and said pressure plate, said one-way clutch having a release plate which when connected to a case ground causes said one-way clutch to release to allow rotation of said control plate relative to said pressure plate in a direction opposite engine rotation;

a release coil connected to said case ground and selectively electrically energized by a clutch control unit for electromagnetically connecting said release plate to said case ground to release said one-way clutch; and a control coil electrically energized by said clutch control unit for electromagnetically linking said control ring to said case ground.

2. The ball ramp actuator of claim 1, wherein said input member comprises a flywheel nonrotatably attached to an engine and where said output member comprises a transmission input shaft.

3. The ball ramp actuator of claim 2, wherein said control coil and said release coil are mounted to said case ground.

4. The ball ramp actuator of claim 3, wherein a friction surface is formed on said control ring for frictionally contacting said control coil to apply a rotational braking torque thereto.

5. The ball ramp actuator of claim 1, wherein said rolling elements are spherically shaped.

6. The ball ramp actuator of claim 1, further comprising a housing attached to said input member and substantially surrounding said ball ramp actuator and a thrust bearing acting between said control ring and said housing for absorbing thrust loads generated when said ball ramp actuator is energized.

7. A driveline clutch utilizing a ball ramp actuator for coupling a flywheel to a transmission input shaft comprising;

a flywheel rotated about an axis of rotation by an engine;

an input shaft and a housing;

a clutch disc splined to said input shaft and radially extending from said input shaft, said clutch disc having friction material on a first surface and a second surface where said first surface frictionally engages said flywheel;

a pressure plate encircling said input shaft and nonrotatably slidingly coupled to said flywheel and having a first surface for frictionally engaging said second surface of said clutch disc;

a ball ramp actuator for moving said pressure plate toward said clutch disc and said flywheel thereby causing said clutch disc to be clamped therebetween comprising: a plurality of plate grooves formed in a second surface of said pressure plate, said plate grooves having portions of varying depth, and rolling members disposed one in each plate groove, and a control ring encircling said input shaft and disposed adjacent to said pressure plate, said control ring having a plurality of ring grooves formed in a first face thereof, said ring grooves being substantially identical to said plate grooves, said plate grooves opposing said ring grooves with a rolling member contacting each pair of opposed ring and plate grooves, said ring grooves and said plate grooves being arranged so that relative angular movement of said pressure plate and said control ring results in an increase and a decrease in an axial separation between said pressure plate and said control ring;

a thrust bearing aperture to absorb axial thrust loads generated by said control ring, said thrust bearing contacting a second face of said control ring and reacting against a housing coupled to said flywheel;

a control coil for selectively inducing a magnetic field in said control ring thereby magnetically coupling said control ring to a case ground member;

a one-way clutch having an inner race attached to said control ring and an outer race attached to said housing adapted to prevent said pressure plate from rotating with respect to said control ring in a direction to release said ball ramp actuator;

a release plate contacting said one-way clutch;

a release coil for selectively inducing a magnetic field in said release plate thereby releasing said one-way clutch to allow said pressure plate to rotate in either a clockwise or counterclockwise direction with respect to said control ring.

8. The driveline clutch of claim 7, wherein said control coil and said release coil are mounted to said case ground member.

9. The driveline clutch of claim 8, further comprising a friction surface formed on said control ring for frictionally engaging said control coil to apply a rotational braking torque thereto.

10. The ball ramp actuator of claim 8, wherein said rolling elements are spherically shaped.

11. A driveline clutch employing a ball ramp actuator comprising:

a flywheel rotatable about an axis of rotation, said flywheel having a flywheel friction surface;

an output member rotatable about an axis of rotation, said flywheel having a flywheel friction surface;

a clutch disc having a first friction surface and a second friction surface rotatable about said axis of rotation of said flywheel, said first friction surface opposed to said flywheel friction surface;

a pressure plate having a friction surface opposed to said second friction surface of said clutch disc, said pressure plate nonrotatably connected to said flywheel;

a ball ramp actuator for axially displacing said pressure plate toward said flywheel, said ball ramp actuator comprising a control ring and an activation ring having opposed faces provided with circumferentially extending grooves, arranged so at least three opposed pairs of grooves, said grooves including portions of varying depth, and rolling members disposed one in each opposed pair of grooves, said grooves on said activation ring and said adjacent control ring being arranged so that relative angular movement of said activation ring and said control ring in a first direction, from a starting position, causes axial movement of said activation ring away from said control ring to move said pressure plate toward said flywheel thereby clamping said clutch disc, said activation ring being linked to said pressure plate, said control ring and said activation ring being rotatably about said axis of rotation;

a one-way clutch having an inner race nonrotatably attached to said control ring and an outer race nonrotatably connected to said flywheel for preventing relative rotation of said activation ring and said control ring in a direction deactivating said ball ramp actuator;

a release plate engaging said one-way clutch for selectively releasing said one-way clutch thereby allowing said activation ring to rotate relative to said control plate in either direction;

coupling means for selectively linking said control ring to a case ground.

12. The driveline clutch of claim 11, wherein said coupling means comprises a coil for inducing a magnetic field in said control ring when said coil is energized with an electrical current thereby applying a braking torque on said control ring.

13. The driveline clutch of claim 12, wherein said coil is electrically energized by a clutch control unit.

14. The driveline clutch of claim 11, wherein said output member is a transmission input shaft.

* * * * *